United States Patent [19]
Erskine

[11] Patent Number: 6,074,967
[45] Date of Patent: Jun. 13, 2000

[54] PRODUCTION OF ROCK WOOL

[75] Inventor: William Robert Erskine, Aboyne, United Kingdom

[73] Assignee: Asset Associates Limited, Aberdeen, United Kingdom

[21] Appl. No.: 09/091,897

[22] PCT Filed: Jan. 3, 1997

[86] PCT No.: PCT/GB97/00019

§ 371 Date: Oct. 26, 1998

§ 102(e) Date: Oct. 26, 1998

[87] PCT Pub. No.: WO97/25286

PCT Pub. Date: Jul. 17, 1997

[30] Foreign Application Priority Data

Jan. 5, 1996 [GB] United Kingdom .................... 9600164
Jul. 4, 1996 [GB] United Kingdom .................... 9614048

[51] Int. Cl.[7] .............................. C03C 6/02; C03C 6/08; C03C 13/06
[52] U.S. Cl. ................. 501/27; 501/28; 501/29; 501/36; 65/469; 65/144; 65/19
[58] Field of Search ................... 501/27, 28, 29, 501/36; 65/469, 144, 19, 20; 106/618, 619

[56] References Cited

U.S. PATENT DOCUMENTS

| 4,023,976 | 5/1977 | Bauer et al. | 501/29 |
| 4,430,125 | 2/1984 | Hascic | 106/619 |
| 4,518,432 | 5/1985 | Hess et al. | 501/29 |
| 4,617,045 | 10/1986 | Bronshtein | 501/29 |
| 5,100,840 | 3/1992 | Urabe et al. | 501/28 |
| 5,472,917 | 12/1995 | Talling et al. | 501/28 |

FOREIGN PATENT DOCUMENTS

| 0 103 195 | 3/1984 | European Pat. Off. . |
| 0 526 697 | 2/1993 | European Pat. Off. . |
| 6183813 | 7/1994 | Japan . |
| 6183816 | 7/1994 | Japan . |
| WO 95/34514 | 12/1995 | WIPO . |
| WO 95/34517 | 12/1995 | WIPO . |

*Primary Examiner*—Karl Group
*Attorney, Agent, or Firm*—Lee, Mann, Smith, McWilliams, Sweeney & Ohlson

[57] ABSTRACT

A method of processing material for use in production of rock wool, comprises providing the material in finely divided form; mixing the finely divided material with a fibrous binding agent; and forming the mixture into solid blocks. The resulting blocks (lacking fines) are in a form suitable for use in the production of rock wool, and may be fed to a smelting furnace, together with other ingredients as appropriate, for processing in conventional manner. In one preferred embodiment, the material is waste rock wool, such as spent hydroponic growth medium or shot. By use of the invention, shot which has hitherto constituted a waste material can be recycled and reused in the production of rock wool, thus obviating the waste disposal problem and improving the overall efficiency of the rock wool production process. The invention also covers the resulting solid blocks and a method of producing rock wool using the blocks.

16 Claims, 1 Drawing Sheet

PRODUCTION OF ROCK WOOL

FIELD OF THE INVENTION

This invention concerns the production of rock wool.

BACKGROUND TO THE INVENTION

Rock wool (referred to incorrectly as mineral wool in our earlier British Patent Applications Nos 9600164.9 and 9614048.8) comprises glassy fibres having good thermal insulation properties, which may be in the form of a mat or loose wool or may be compressed to form eg boards and pipe sections. Rock wool is used as a growing medium in the technique of hydroponics, and is used in the construction industry as a thermal and acoustic insulating material, eg under the name Rocksil (Rocksil is a Trade Mark of Owens Corning).

Rock wool is typically produced by smelting minerals containing silica, alumina, magnesium, calcium and iron, which are mixed with coke fuel. The mixture is smelted to a high temperature, about 1500° C., generally in a special furnace known as a cupola. The resulting melt is blown in a fibrous form over rollers. It is a characteristic of the known production process that as much as 30% of all production is sub-standard and is in globular or spherical form, known as shot or overshot, rather than the desired fibrous form. The shot is relatively dense and sandy in consistency, and its particulate nature is such that it cannot be mixed with the cupola input material for reprocessing. This arises because the cupola based process only functions properly when the size of the raw materials is such as to permit the free passage of air and gases through the cupola during the smelting process. As a result, the shot currently constitutes a non-reusable waste material that requires disposal.

At present waste rock wool shot is mainly disposed of by landfill, but in the current climate of rising environmental standards and the imminent increase in the cost of landfill, this approach is becoming less attractive.

It has been proposed to compress the waste material into solid blocks such as briquettes, weighing 125 to 250 grams or more, but the sandy consistency has meant that the resulting briquettes have possessed very poor strength and have tended to crumble without the addition of a binder. Binder materials so far proposed comprise molasses, dextrin and natural latex, which also create further environmental problems and do not contribute thermal stability. Moreover, the cost of these binder materials is not insignificant which would add to the cost of the overall process and would inevitably be reflected in the price of the rock wool.

The present invention is based on use of alternative binder materials that enable, inter alia, an alternative approach to be taken to the treatment and handling of rock wool shot.

SUMMARY OF THE INVENTION

In one aspect, the present invention provides a method of processing material for use in production of rock wool, comprising providing the material in finely divided form; mixing the finely divided material with a fibrous binding agent; and forming the mixture into solid blocks.

The resulting blocks (lacking fines) are in a form suitable for use in the production of rock wool, and may be fed to a smelting furnace, together with other ingredients as appropriate, for processing in conventional manner. On heating in the furnace, the blocks melt without breaking up before entering the melt zone, releasing the ingredients in an appropriate form for production of rock wool.

In a further aspect, the present invention thus provides a method of producing rock wool, wherein at least one of the raw materials is supplied to the smelting furnace in the form of solid blocks comprising an agglomerate of the raw material in finely divided form, admixed with fibrous binding agent.

The invention also includes within its scope a solid block comprising an agglomerate of material for use in the production of rock wool, in finely divided form, admixed with fibrous binding agent.

The material may be any appropriate ingredient for rock wool production. If the material is not initially in finely divided form, the material is suitably processed as a preliminary step to produce the material in finely divided form, eg as a powder, microfibres or microbeads. Suitable techniques are well known, including grinding and crushing, possibly preceded by a delumping step, if required. Particle size is not critical, but the maximum dimension is generally in the range 100 micron to 5 mm. Particle size in a particular batch of material will typically be reasonably uniform, although this is not critical.

The material is preferably in a sandy fines form (ie of generally spherical form) to allow maximum interface of the material with the fibres of the binding agent (in a fines/fibres/fines arrangement) so that on formation into a solid block, eg on compression, the material particles weaken the fibres and spread them so the fibres act as a protective buffer, reducing wear that would otherwise be caused.

In one preferred embodiment, the material is waste rock wool, such as spent hydroponic growth medium or shot. In the case of shot, the material is initially ground up, conveniently using a gyratory crusher such as a Dragon (Dragon is a Trade Mark) machine from Babbitless and Company to produce finely divided particles having a maximum dimension of less than 30 mm. In this way, rock wool shot which has hitherto constituted a waste material can be recycled and reused in the production of rock wool, thus obviating the waste disposal problem and improving the overall efficiency of the rock wool production process.

In a preferred aspect the invention thus provides a method of processing rock wool shot to enable it to be reprocessed in a cupola comprising the steps of:

(1) grinding the rock wool shot into finely divided particles,
(2) mixing therewith cellulose fibre or fibrous organic waste to serve as a binding agent,
(3) compressing the mixture so as to form an agglomerate thereof, and either simultaneously shaping and sizing the agglomerated material into blocks, briquettes or boules, or cutting up or otherwise breaking off conveniently sized blocks or boules of the agglomerated material from agglomerate formed en masse.

According to a further aspect of the invention, a process enabling spent hydroponic rock wool-based growing medium to be recycled comprises the steps of subjecting the spent material to high pressure to squeeze out water, removing further moisture by drying the squeezed material, mixing the dried squeezed material with fibrous material to serve as a binder and forming an agglomerate of the two materials to form blocks, boules, briquettes or the like therefrom.

Many of the raw materials used in rock wool production are available in the form of finely divided powders (fines), but are of a size that is too small to be used as a raw material ingredient for a cupola. However, by agglomerating such raw material fines with a fibrous binding agent as provided by the invention, otherwise unusable raw material fines can be used in rock wool production.

According to another preferred aspect of the invention, one of the raw material ingredients used as an input to a rock wool forming system in a finely divided, particulate or powdered form (ie as fines) may be admixed with cellulose fibre or fibrous organic waste which latter serves as a binding agent for the raw material fines, and thereafter may be compressed to form an agglomerate of the admixture in the form of boules or blocks or briquettes of sufficient size and density to permit their inclusion as part of a cupola charge for reprocessing.

Since a given mass of fines is disproportionately cheap in relation to larger sized pieces of the same raw material having the same mass, a significant saving on raw material cost can be expected.

The invention may, for example, be employed to convert crushed egg shells into solid blocks, to provide a calcium fraction for a cupola charge.

Fragments from the quarrying of magnesium-bearing rock or one may also be converted into blocks in accordance with the invention. As with rock wool shot, the fragments of rock or ore may be ground into a powder before mixing with the fibrous binding agent for agglomeration.

Slag from the iron and steel industry is one of the sources of iron for the rock wool production process. This slag is also available in various sizes, and finely divided forms (slag fines) cannot be used in a cupola. However, in accordance with the invention they can be agglomerated into suitably sized lumps for use in a cupola-based smelting process.

Certain industrial wastes contain silica and alumina but tend to be in finely divided form unsuited for addition to a cupola. Again, the invention may be used to produce an agglomerated form of the silica and/or alumina fines, enabling these to be used as raw materials in a cupola based smelting process.

The fibrous binding agent is preferably derived from plant material and preferably comprises cellulose fibres. One preferred fibrous binding agent comprises fibrous material obtained from paper or cardboard, eg waste paper or cardboard, particularly shredded or ground up paper or cardboard. Particularly good results are obtained using shredded or ground up carbonless copying paper, eg from NCR. Such material comprises a high grade washed paper, non lignin, cellulosic, with surface and under coatings of black carbon type die in carrier, and an under coating including traces of clays, clay minerals or clay-like minerals such as montmorillonite, bentonite and fuller's earth. When mixed with sodium silicate (as described below) and water these materials become plastic and mouldable and lend themselves to the process of briquetting of materials such as shot residues. Because minerals such as montmorillonite are alkaline, this assists setting of sodium silicate. Alternative fibrous binding agents include fragments of dried straw, and the fibrous component of processed sewage sludge, eg obtained as described in our copending UK Patent Application No. 9526317.4.

The use of such sources of fibrous material as the binding agent has the added benefit that when dried and compressed the binding agent is readily combustible and possesses a worthwhile calorific value as a fuel. When added to a cupola, the calorific value of the binding agent adds to the other exothermic reactions occurring in the melt and reduces the quantity of other fuels which are needed per charge loaded into the cupola. Fibrous material from different sources has varying contents of volatiles, carbon and celluloses, in the latter case possibly as a result of having been subjected to washings by bleaches etc. The varying nature of the fibrous material may be taken into account in appropriate manner in practice of the invention.

Particle size of the fibrous binding agent is not critical, but the maximum dimension is generally in the range 100 micron to 5 mm, preferably 1 mm to 3 mm. The fibrous binding agent is preferably in dry condition.

The size and shape of the fibrous binding agent will depend on factors including the nature and source of the material and the nature of the shredding or grinding equipment, if used.

For example, material may be ground up using a grinder such as a Hosokawa Micron grinder, which typically produces fragments having a maximum dimension of about 2 mm. A hammer mill, with bar screen, acts to fractionate material such as paper creating fibres. For instance, a Christy Hunt hammer mill (meat chest type) with a 2 mm or 3 mm bar screen produces fragments with excellent fibrous qualities. Material may alternatively be granulated into generally circular pieces, approximately 2.5 mm in diameter, eg using Cumberland equipment from Blackfriars Company. Other suitable equipment includes Alpine from Hosokawa, which produces particles of hexagonal, broken-edged shape, and Miracle Mills, London, having a selection of round holes and rectangular holes that produce fibrous particles.

The relative quantities of finely divided material and fibrous binding agent are not critical, and appropriate proportions to produce solid blocks having desired characteristics can be readily determined by experiment.

The fibrous binding agent may comprise up to, say, 50% of the total weight of block ingredients, but for reasons of space efficiency will usually comprise a smaller amount, typically 20% or less. Good results have been obtained with fibrous binding agent present in amounts of 5%, 7% and 10% the total weight of block ingredients.

The ingredients are conveniently mixed in suitable mixing apparatus, typically using a continuous mixer, of which there are many examples. These include paddle mixers, shoe mixers (eg manufactured by Morton) which have a shoe shape which when turning in the mixing drum causes Van Der Walls pressures to be exerted on the mix giving greater mixing ability, pan type mixers (eg from Eriech) where the pan can move, shovel type lifter mixes, some with a combination of parallel sets of intermeshing rotors which mix and move the material forwards, rotor mixers (such as Becken twin rotor mixers), and Khal mixers.

The mixture is conveniently formed into solid blocks by a process of agglomeration, typically involving compression. Equipment for forming solid blocks in a range of different sizes and shapes, including those known as briquettes, boules, prills etc, is commercially available. It is currently preferred to use a roller press, eg from Bepex, operating at 50 bar pressure, to produce pillow-shaped briquettes, about 125 mm long, about 50 mm wide and about 35 mm thick weighing about 145 grams.

Compression may alternatively be performed using, for example, an OHP Hydraulic machine or a P.O.R. Briquetting System such as supplied by P.O.R. Brescia, Italy.

In a hydraulic piston briquettor the densification causes a cellulose fibrous binding agent to act as a host for the material, eg ground rock wool shot, and the lignins, waxes and fats usually found in cellulosic materials act as a lubricant. The result is a dense briquette of agglomerated material, and the lubricant significantly reduces wear on the machinery.

Optional additives may be included in the mixture, if desired.

For example, it is preferred to include a silicate, preferably sodium silicate but possibly also calcium silicate or aluminium silicate, typically in an amount in the range 1 to 15%, preferably 5 to 10%, of the total weight of block ingredients. The silicate may be in the form of a powder or an aqueous solution. The silicate acts as a binder and has the effect of markedly increasing the hardness of the resulting solid block. On subsequent heating of the block in production of rock wool, the silicate has the effect of delaying degradation of the block in the cupola thus lengthening the so-called induration period (melt time) of the charge. The greater the amount of silicate used, the greater the lengthening of the melt time. For example, a block containing 10% by weight of silicate may not melt until at a temperature of 1150–1200° C. Silicate can give increased strength to a block, preventing the block breaking up when exposed to increasing heat. Further, the carbon dioxide in the cupola can act as a catalyst in helping "set" the silicate, giving the block endurance in its path through the cupola. During the rock wool production process, the silicate takes part in the glass forming reaction.

Use of a silicate is also found to have the advantage of enabling block formation at lower pressures that would otherwise be the case. For example, a Bepex roller press produced satisfactory briquettes when operated at 50 bar pressure, rather than a pressure of 85 bar that would otherwise be required in the absence of silicate, with consequent reduction in press wear.

As another example of additive, a water-based two part polymeric binding material, such as the material known as Elviron (Elviron is a Trade Mark) from Du Pont, may be added to decrease the water absorbtion properties of the agglomerated material. In this way the agglomerated material can be rendered relatively waterproof, thereby enabling blocks thereof to be stored without degradation due to dampness.

Cement may additionally or alternatively be used as an additive.

Details of rock wool production vary in different parts of the world depending on factors including availability of raw materials, product requirements etc, and the formulation of the blocks can be varied as appropriate to suit local requirements, to give optimum results and best cost advantages.

In the processing method of the invention, the mixture to be formed into solid blocks is preferably in moist condition without being too wet (typically having a total water content in the range 6 to 10% by weight), with water being added to moisten the ingredients if necessary. Alternatively, moistening may be achieved by using a silicate preferably sodium silicate, in the form of an aqueous solution which may be mixed with the ingredients or sprayed onto the ingredients.

In use of blocks of the invention in production of rock wool, blocks including some or all of the ingredients are fed to a cupola, eg in batches of, say, 20 kgs, 50 kgs, 100 kgs and 200 kgs, together with any other required ingredients. The materials travel downwardly through the cupola through zones of increasing temperature, with residence time in the cupola being about 2 to 3 hours. At the top of the cupola the temperature is about 150° C., increasing downwardly through about 250/300° C. and then onwards to a melt zone at a temperature at which the blocks melt, which temperature depends on the exact nature of the blocks. The blocks are initially stable and start to melt at temperatures of approximately 1150–1200° C. The resulting molten mass, at about 1500° C. is allowed to enter rollers where with high pressure air the mass is blown and the wheels rotate, producing fibres of rock wool. Exact timings, temperatures etc depend on the starting materials.

The invention will now be further described, by way of illustration, in the following Examples and by reference to the accompanying drawings in which:

DETAILED DESCRIPTION OF THE DRAWINGS

Figure 1:
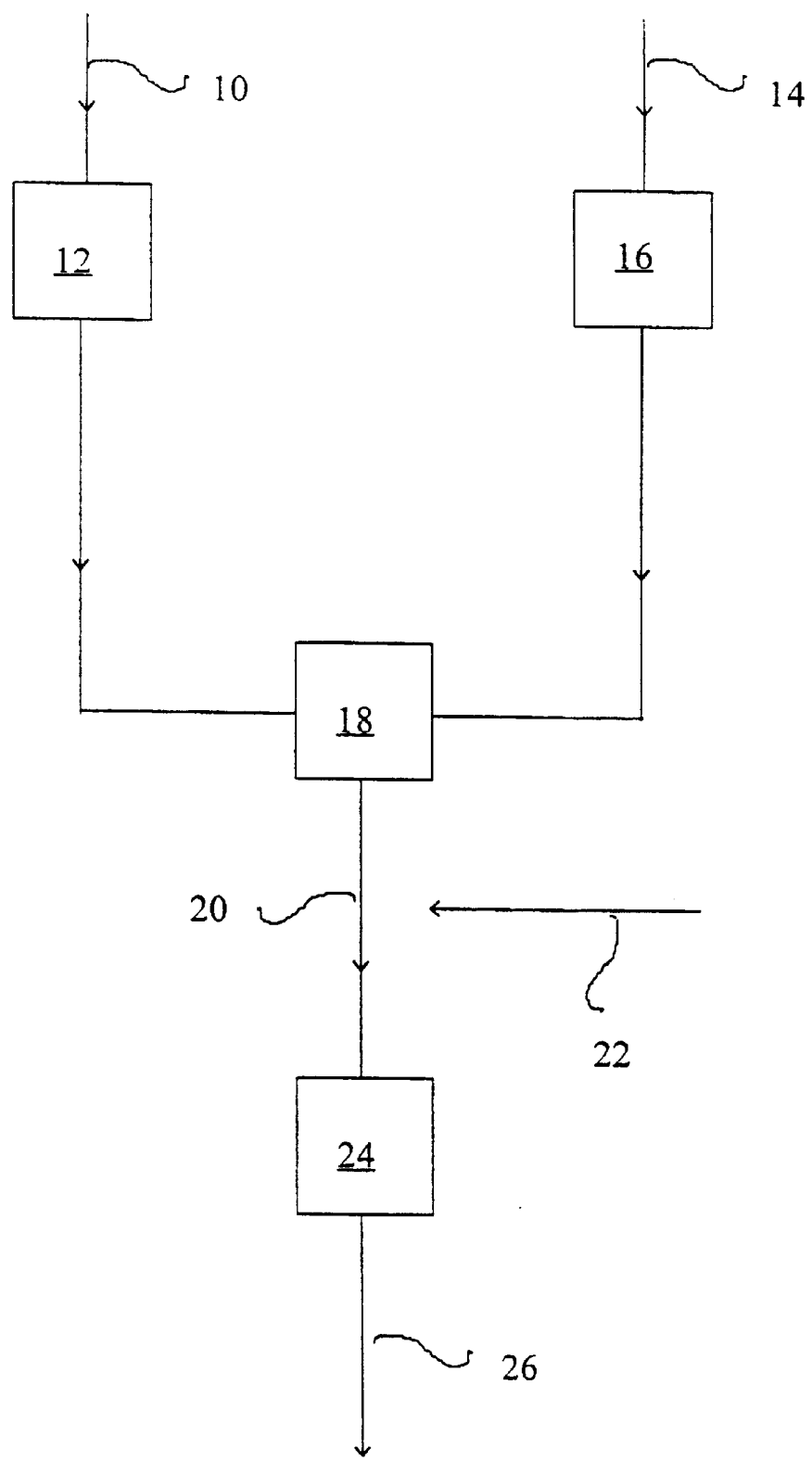
FIG. 1 is a schematic representation of one embodiment of a method of processing rock wool shot.

Referring to FIG. 1, rock wool shot represented by arrow 10 is supplied to a Dragon gyratory crusher 12 (from Babbitless and Company) where the shot is ground up into particles having a maximum dimension of less than 30 mm. A supply of waste paper represented by arrow 14 is supplied to a Hosokawa micron grinder 16 where the paper is shredded into small fragments having a maximum dimension of about 2 mm. The ground up shot and shredded paper are then both supplied to mixing apparatus 18 where the two materials are mixed to form a generally homogenous mixture. The resulting mixture is fed in a stream 20 which is sprayed with aqueous solution of sodium silicate represented by arrow 22 and passed to a Bepex roller press 24. Press 24 is operated at about 50 bar pressure and produces a supply of pillow-shaped briquettes, about 125 mm long about 50 mm wide and about 35 mm thick, weighing about 145 grams, represented by arrow 26. Optional delumping equipment (not shown) may be included upstream of crusher 12, if required, to break up the shot into smaller pieces suitable for supply to the crusher.

Delumping may be effected, for example, by a toggle press eg from Christy Hunt, or by a revolving mandrel which crushes the material as it moves downwards through the crushing zone. This crushing zone could be eccentric, or in a hammer mill. An alternative simple de-lumper could be by Condux of Middlesex, which has a revolving set of star shaped spacers which allow the material to fit into the crevices and be broken smaller ready for final milling in a hammer mill or other device.

The resulting briquettes are then used in the production of rock wool, by being supplied to a cupola (not shown) together with other appropriate conventional ingredients for melting in conventional manner.

EXAMPLE 1

Using equipment generally as described with reference to FIG. 1, 20% by weight shredded waste paper mixed dry with 80% by weight ground rock wool shot produced a relatively stable agglomerate when subjected to agglomeration by compression of pressures in the range 20–200 bar. No sodium silicate was used in this example.

EXAMPLE 2

In a modification of Example 1, using substantially the same proportions of dry shredded waste paper and ground rock wool shot, together with 1 to 10% sodium silicate (either in the form of dry powder added to mixing apparatus 18 or in the form of an aqueous solution added to the mixing apparatus 18 or sprayed on at 22), much harder and more thermally stable agglomerates were produced using the same range of pressures.

EXAMPLE 3

Using equipment generally as described with reference to FIG. 1, it was found that a mixture of shredded waste paper, dried fibrous material obtained by separating the main components of raw sewage sludge, and ground rock wool shot in approximate weight proportions of 7%:7%:80% with approximately 5% sodium silicate, produces satisfactory briquettes.

EXAMPLE 4

Granulated or shredded waste paper was added to ground rock wool shot residue and mixed thoroughly, the action of the mixing between the paper pieces and the rock wool residue serving to attrite or wear down the paper. At this stage a sodium silicate solution (Crystal 90 (Crystal is a Trade Mark) from Crosfield) was added and further mixing carried out. A batch mix procedure was used, although continuous mixing could be used instead.

The mix was then introduced into an OHP hydraulic piston briquettor and the mix compressed. The result was an extremely hard recycled rock wool residue briquette held at green strength by the paper/sodium silicate mix. At this stage the briquette was of sufficient strength that it could be recycled into a cupola where the heat and $CO_2$, which serves also as a natural catalyst, act to harden the briquette and allow it to enter into the melt zone without breaking up.

Various proportions of mix were used:
a) 2% sodium silicate
   2% waste paper
   balance rock wool residues
b) 3% sodium silicate
   2, 3, 4, 5 or 6% waste paper
   balance rock wool residues
c) The mix was changed and 3, 4, 5, or 6% sodium silicate was used.

The better results obtained were 4–5% sodium silicate and 3–4% waste paper. However, the mix may need to vary, depending on the grade of rock wool residue used.

It was found that the waste paper needed to be shredded into small pieces since its thickness could vary substantially, eg. from thin copy paper, fax or computer paper, up to thick cardboard. Thinner paper was found to give better results for pressing within a sand type rock wool overshot mixture.

The sodium silicate could be used either in dry power or water based form, the proportion of solids to water varying.

In some cases a two-part exothermic binder (Elviron) was also used in conjunction with a paper and rock wool mix. The binder was admixed with the sodium silicate as a mixed binder, and good results were obtained.

The binder was also mixed with a two-part binder and gassed, the gas acting as a catalyst setting agent.

As an alternative to waste paper, various types of dried chopped up straw were used, and this showed that again the biomass acted as a good green strength aid in briquetting.

EXAMPLE 5

In the horticultural technique of "hydroponics", plants such as peppers, tomatoes and cucumbers are grown in a medium formed from rock wool. In time growing medium becomes root bound and has to be discarded.

In this example, rock wool based growing medium was used as source of rock wool. The spent medium was subjected to high pressure to squeeze out water, and further moisture was removed by drying the squeezed material. The dried squeezed material was then mixed shredded paper and processed as described with reference to FIG. 1.

Root material (which is largely cellulose) in the spent medium acts as a binder, constituting part of the fibrous binding agent, so less added binding agent is needed.

Sodium silicate may to advantage be added as described above and acts to extend the induration period when the agglomeration material is subsequently introduced into a cupola for smelting.

EXAMPLE 6

In a procedure similar to Example 1, dolomite fines were mixed with 10% fibres (shredded paper) and compressed into briquettes in a downstroke hydraulic press at 75 bar pressure. The resulting briquettes had good green strength.

Boron fines from boron-containing minerals were similarly treated, with good results.

A mixture of boron-containing minerals, dolomite, quartz and slag all in particles under 2.5 mm were mixed with 10% paper fibre and 10% sodium silicate, and compressed into briquettes in a downstroke hydraulic press operated at 75 bar pressure. The resulting briquettes were of high green strength and ready to be introduced into a cupola as part of a mix for making rock wool.

A similar mixture, additionally including 10% coke fines, was treated in a similar way with similar results. In this way the coke which would not hitherto have been usable in the production of rock wool because in the form of fines could be used.

What is claimed is:

1. A method of processing material for use in production of rock wool, comprising
   a. providing the material in finely divided form;
   b. mixing the finely divided material with a fibrous binding agent and with a silicate comprising sodium, calcium and/or aluminum; and
   c. forming the mixture into solid blocks.

2. A method according to claim 1, in which the mixture is formed into solid block by a process of agglomeration.

3. A method according to claim 2, in which the agglomeration is by compression.

4. A method according to claim 3, in which the compression is performed using a roller press.

5. A method according to claim 1, in which the mixture to be formed into solid blocks is in moist condition.

6. A method of producing rock wool, comprising supplying raw materials to a smelting furnace, wherein at least one raw material is in the form of solid blocks comprising an agglomerate of the raw material in finely divided form, admixed with fibrous binding agent and with a silicate comprising sodium, calcium and/or aluminum, and forming the solid blocks into rock wool.

7. A solid block comprising an agglomerate of material for use in the production of rock wool, in finely divided form, the material being admixed with fibrous binding agent and with a silicate comprising sodium, calcium and/or aluminum.

8. The block of claim 7, in which the material is waste rock wool.

9. The block of claim 8, in which the waste rock wool comprises spent hydroponic growth medium or shot.

10. The block of claim 7, in which the fibrous binding agent includes plant material.

11. The block of claim 10, in which the fibrous binding agent comprises cellulose fibres.

12. The block of claim 10, in which the fibrous binding agent comprises fragments of paper or cardboard.

13. The block of claim 7, in which the fibrous binding agent comprises up to 50% of the total weight of block ingredients.

14. The block of claim 13, in which the fibrous bonding agent comprises not more than 20%.

15. The block of claim 13, in which the block mixture includes silicate, in an amount in the range 1 to 15% of the total weight of block ingredients.

16. The block of claim 13, in which the silicate is sodium silicate.

* * * * *